J. W. SOUTHER.
MECHANISM FOR SUPPORTING AUTOMOBILES FOR TRANSPORTATION.
APPLICATION FILED JUNE 24, 1916.
1,202,912.  Patented Oct. 31, 1916.
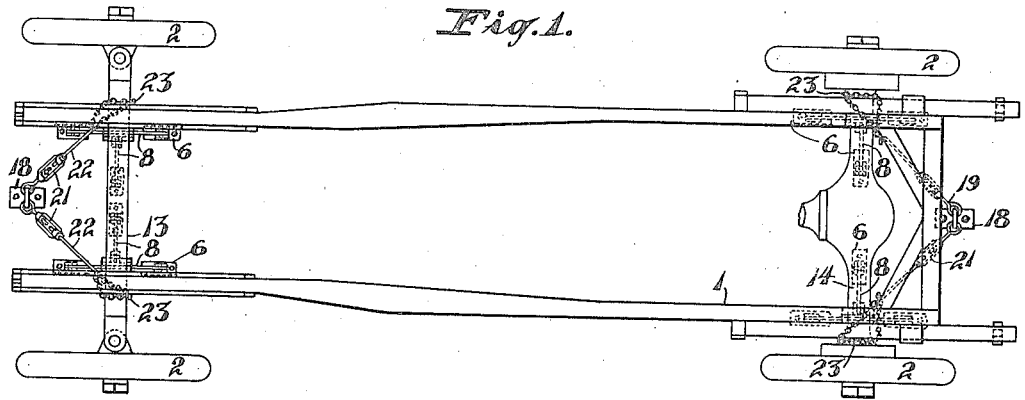
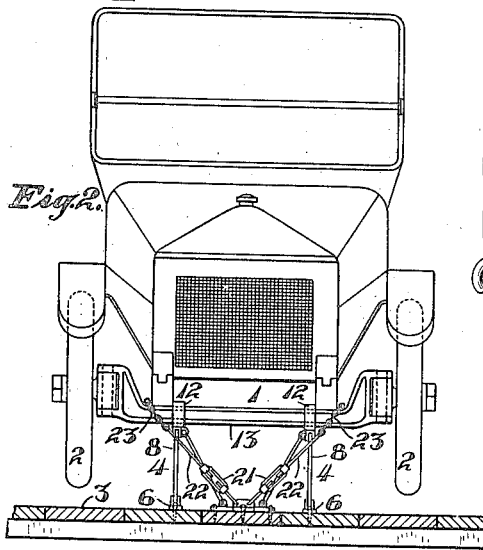
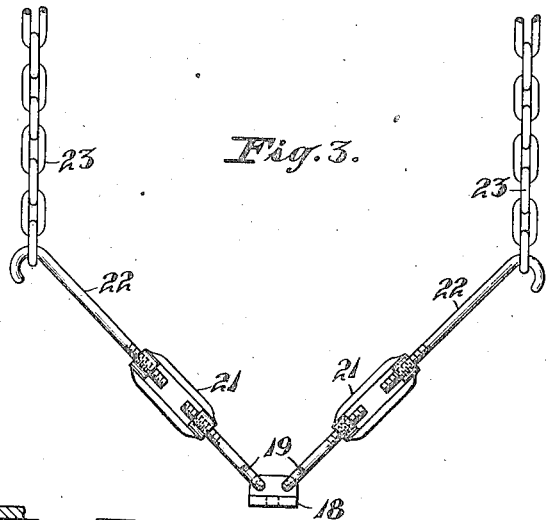
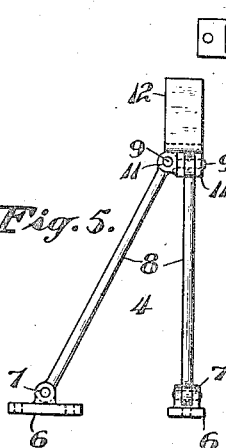
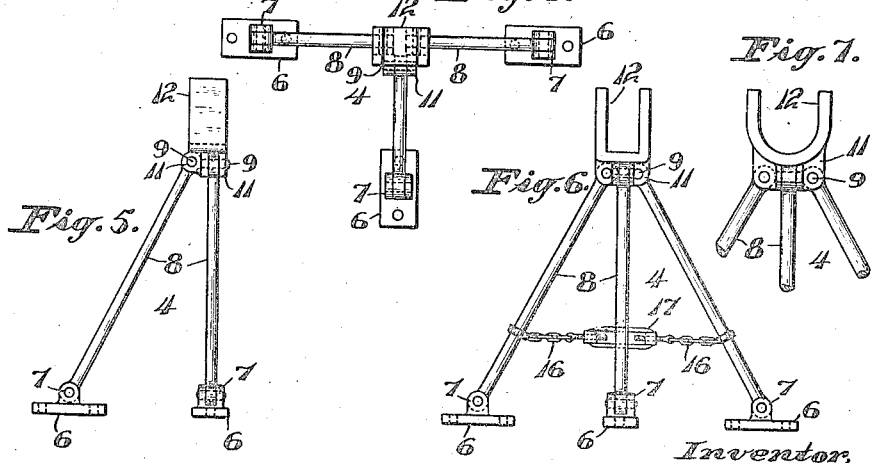
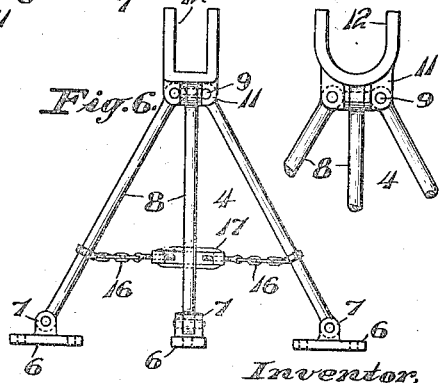
Inventor,
J. W. Souther,
per Wright
Attorney

UNITED STATES PATENT OFFICE.

JOSEPH W. SOUTHER, OF SAN FRANCISCO, CALIFORNIA.

MECHANISM FOR SUPPORTING AUTOMOBILES FOR TRANSPORTATION.

1,202,912.  Specification of Letters Patent.  Patented Oct. 31, 1916.

Application filed June 24, 1916. Serial No. 105,640.

*To all whom it may concern:*

Be it known that I, JOSEPH W. SOUTHER, a citizen of the United States, residing at San Francisco, in the county of San Francisco and State of California, have invented new and useful Improvements in Mechanism for Supporting Automobiles for Transportation, of which the following is a specification.

The object of the present invention is to provide improved means for loading on cars vehicles, especially those having pneumatic tires. At present the method of loading such vehicles on cars for transportation is to secure them with the tires on the floor of the car. By reason of the vibration of the car in transit, there is a certain amount of friction between the tires and the floor, which, continued for many hours, or perhaps days, has the effect of seriously damaging the tire at the points of contact.

The object of my invention is to provide means for avoiding this damage in transportation.

In the accompanying drawing, Figure 1 is a plan view of a portion of an automobile supported on my improved means for transporting the same; Fig. 2 is an end view of the same; Fig. 3 is an enlarged view of a tie for holding the automobile in place; Fig. 4 is a plan view of a frame; Fig. 5 is a front view of the same; Fig. 6 is a side view of the frame when used for the front axle; Fig. 7 is a broken view, similar to Fig. 6, of the frame when used for the rear axle.

Referring to the drawing, I indicates the lower portion of an automobile. Instead of supporting it in a car by placing the tires 2 upon the floor 3 of the car I provide frames 4, each comprising three plates or feet 6, which are adapted to be secured by nails or screws to the floor of the car, and each of which plates has an upwardly extending pair of apertured lugs 7. Between each pair of lugs is pivoted the lower end of a rod 8, the upper ends of said rods being pivoted, as shown at 9, to lugs 11 extending from the lower portion of a U-shaped holder 12. Four of these frames are used for each automobile, two to receive the front axle 13 of the automobile on opposite sides of the middle, and two to receive in like manner the rear axle 14 of the automobile.

Each frame is so arranged that two of the rods extend obliquely in a longitudinal vertical plane while the other rod extends obliquely inward in a transverse plane. The holders 12 for the front axle are rectangular, as shown in Fig. 6, while those for the rear axle are rounded, as shown in Fig. 7. If desired, the rods of each holder which extend in the same plane may be attached to chains 16, which are attached to a turn buckle 17 to prevent said rods from spreading. In addition there are secured to the floor of the car, plates 18, attached to which are hooks 19, connected to turn buckles 21, which are connected to hooks 22, which are connected to chains 23, which are passed tightly around the axles or frame of the automobile and then connected at their ends to said hooks 22. By means of these chains and turn buckles the car is held firmly against longitudinal movement. In case it is desired to support the automobile in the upper portion of the railroad car the frames 12 and plates 18 are secured to suitable beams or raised portions of the frame of the car.

I claim:—

1. Means for securing a wheeled vehicle on a railroad car or the like comprising suitable supporting means, a pair of frames for supporting each axle of the vehicle and supported by said supporting means, a pair of chains adapted to be connected to each end of the vehicle and to be operatively connected to said supporting means, and turn buckles for tightening said chains.

2. Means for securing a wheeled vehicle on a railroad car or the like comprising suitable supporting means, a pair of frames for supporting each axle of the vehicle and supported by said supporting means, each frame comprising two rods substantially in the same vertical plane and a third rod in a plane at right angles thereto, plates to which the lower ends of the rods are pivoted, and holders to which their upper ends are pivoted, a pair of chains adapted to be connected to each end of the vehicle and to be operatively connected to said supporting means, and turn buckles for tightening said chains.

3. Means for securing a wheeled vehicle on a railroad car or the like comprising suitable supporting means, a pair of frames for supporting each axle of the vehicle and supported by said supporting means, each frame comprising two rods substantially in the same vertical plane and a third rod in a plane at right angles thereto, plates to which the lower ends of the rods are pivoted, holders to which their upper ends are pivoted, and taut chains connecting the first-named rods, a pair of chains adapted to be connected to each end of the vehicle and to be operatively connected to said supporting means, and turn buckles for tightening said chains.

JOSEPH W. SOUTHER.